United States Patent [19]
Bennett Harris

[11] Patent Number: 6,080,034
[45] Date of Patent: Jun. 27, 2000

[54] MULTI-CULTURAL DOLL

[76] Inventor: Shirley R. Bennett Harris, 519 Tuggle St., Durham, N.C. 27713

[21] Appl. No.: 09/090,134

[22] Filed: Jun. 4, 1998

[51] Int. Cl.[7] .............................. G09B 5/06; A63H 33/22; A63H 3/33; A63H 3/28
[52] U.S. Cl. ........................ 446/219; 446/485; 446/226; 446/302; 434/267; 434/396; 434/370; 434/309; 434/319
[58] Field of Search ..................... 434/267, 396, 434/370, 309, 321, 259; 446/226, 302, 219, 485

[56] References Cited

U.S. PATENT DOCUMENTS

| | | | |
|---|---|---|---|
| 1,341,985 | 6/1920 | Kemp. | |
| 3,755,960 | 9/1973 | Tepper | 46/118 |
| 3,974,593 | 8/1976 | Walker | 46/22 |
| 4,696,653 | 9/1987 | McKeefery | 446/175 |
| 4,768,960 | 9/1988 | Pan | 434/269 |
| 4,799,171 | 1/1989 | Cummings | 364/513 |
| 4,921,459 | 5/1990 | Cook | 446/321 |
| 5,277,644 | 1/1994 | Osborne | 446/219 |
| 5,288,259 | 2/1994 | Konta | 446/219 |
| 5,376,038 | 12/1994 | Arad | 446/297 |
| 5,791,965 | 8/1998 | Kim | 446/219 |

*Primary Examiner*—Kien T. Nguyen
*Assistant Examiner*—Kevin Hughes

[57] ABSTRACT

A multi-cultural doll is provided including a color changing mechanism situated therein for changing a color of the doll to simulate persons of various cultures.

4 Claims, 2 Drawing Sheets

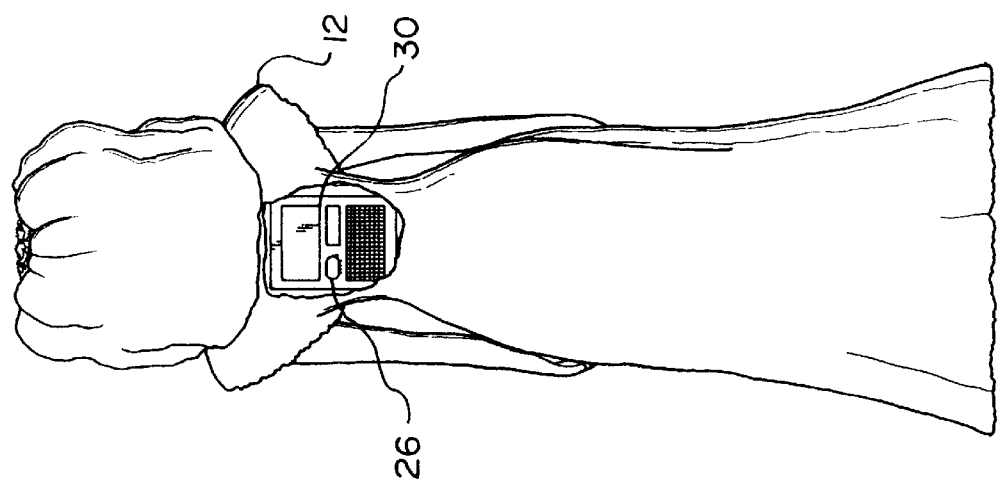
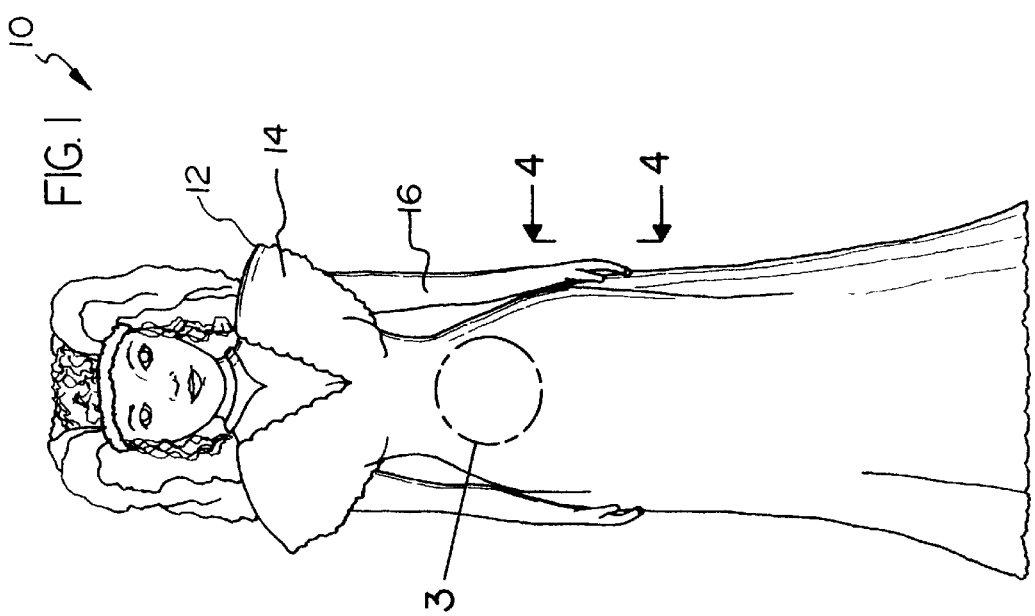

MULTI-CULTURAL DOLL

BACKGROUND OF THE INVENTION

1. Field of the Invention

The present invention relates to dolls and more particularly pertains to a new multi-cultural doll for teaching users about various cultures.

2. Description of the Prior Art

The use of dolls is known in the prior art. More specifically, dolls heretofore devised and utilized are known to consist basically of familiar, expected and obvious structural configurations, notwithstanding the myriad of designs encompassed by the crowded prior art which have been developed for the fulfillment of countless objectives and requirements.

Known prior art dolls include U.S. Pat. No. 4,675,519; U.S. Pat. No. Des. 320,243; U.S. Pat. No. 4,267,551; U.S. Pat. No. 5,376,038; U.S. Pat. No. 4,696,653; and U.S. Pat. No. 4,799,171.

In these respects, the multi-cultural doll according to the present invention substantially departs from the conventional concepts and designs of the prior art, and in so doing provides an apparatus primarily developed for the purpose of teaching users about various cultures.

SUMMARY OF THE INVENTION

In view of the foregoing disadvantages inherent in the known types of dolls now present in the prior art, the present invention provides a new multi-cultural doll construction wherein the same can be utilized for teaching users about various cultures.

The general purpose of the present invention, which will be described subsequently in greater detail, is to provide a new multi-cultural doll apparatus and method which has many of the advantages of the dolls mentioned heretofore and many novel features that result in a new multi-cultural doll which is not anticipated, rendered obvious, suggested, or even implied by any of the prior art dolls, either alone or in any combination thereof.

To attain this, the present invention generally comprises a doll simulating a form of a woman and having miniature clothes being situated thereon. The doll has a head and appendages being constructed from a soft transparent material such as silicon or the like. A plurality of fiber optic strands are mounted in side-by-side relationship within the transparent material. Next provided is a color selector assembly having a disk-shaped translucent color wheel with a plurality pie-shaped sections each having a unique shade of color. The color wheel is coupled in concentric relationship with a post which is in turn rotatably mounted within an interior of the doll. The color selector assembly further includes a dial fixed on an end of the post and extending from a rear surface of the doll. The dial serves for manually rotating the color wheel. The color selector assembly further includes a bulb fixedly mounted within the interior space of the doll adjacent to a first side of the color wheel. Ends of each of the fiber optic strands of the doll terminate on a second side of the color wheel adjacent to the bulb. As such, a color of the doll may be changed by way of the dial. Mounted within a rear of the doll is a tape player for playing back a message associated with an ethnicity associated with the current color of the doll.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new multi-cultural doll apparatus and method which has many of the advantages of the dolls mentioned heretofore and many novel features that result in a new multi-cultural doll which is not anticipated, rendered obvious, suggested, or even implied by any of the prior art dolls, either alone or in any combination thereof.

It is another object of the present invention to provide a new multi-cultural doll which may be easily and efficiently manufactured and marketed.

It is a further object of the present invention to provide a new multi-cultural doll which is of a durable and reliable construction.

An even further object of the present invention is to provide a new multi-cultural doll which is susceptible of a low cost of manufacture with regard to both materials and labor, and which accordingly is then susceptible of low prices of sale to the consuming public, thereby making such multi-cultural doll economically available to the buying public.

Still yet another object of the present invention is to provide a new multi-cultural doll which provides in the apparatuses and methods of the prior art some of the advantages thereof, while simultaneously overcoming some of the disadvantages normally associated therewith.

Still another object of the present invention is to provide a new multi-cultural doll for teaching users about various cultures.

Even still another object of the present invention is to provide a new multi-cultural doll that includes a color changing mechanism situated therein for changing a color of the doll to simulate persons of various cultures.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front view of a new multi-cultural doll according to the present invention.

FIG. 2 is a rear view of the present invention.

DESCRIPTION OF THE PREFERRED EMBODIMENT

Figure 3:
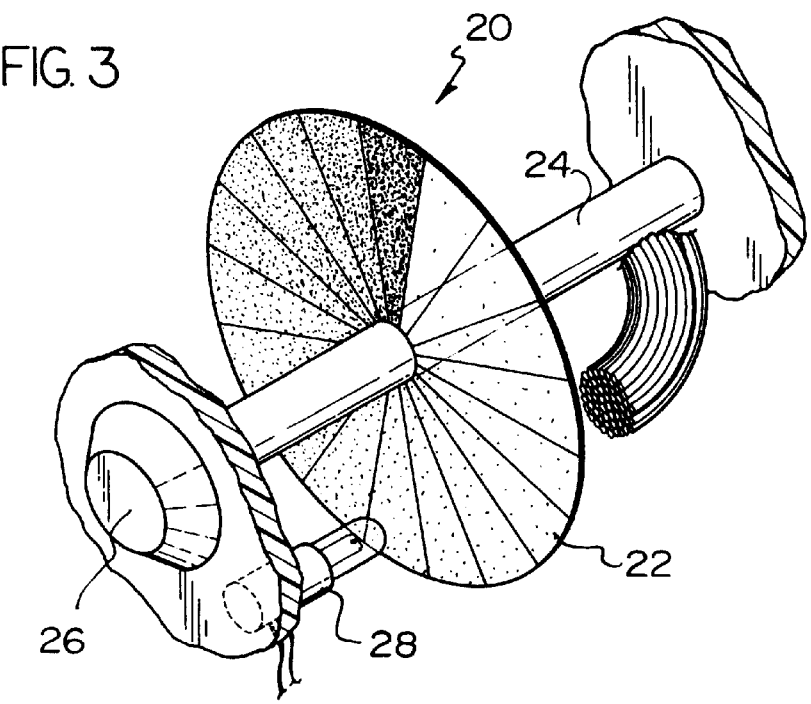
FIG. 3 is a perspective view of the color selector assembly of the present invention.
Figure 4:
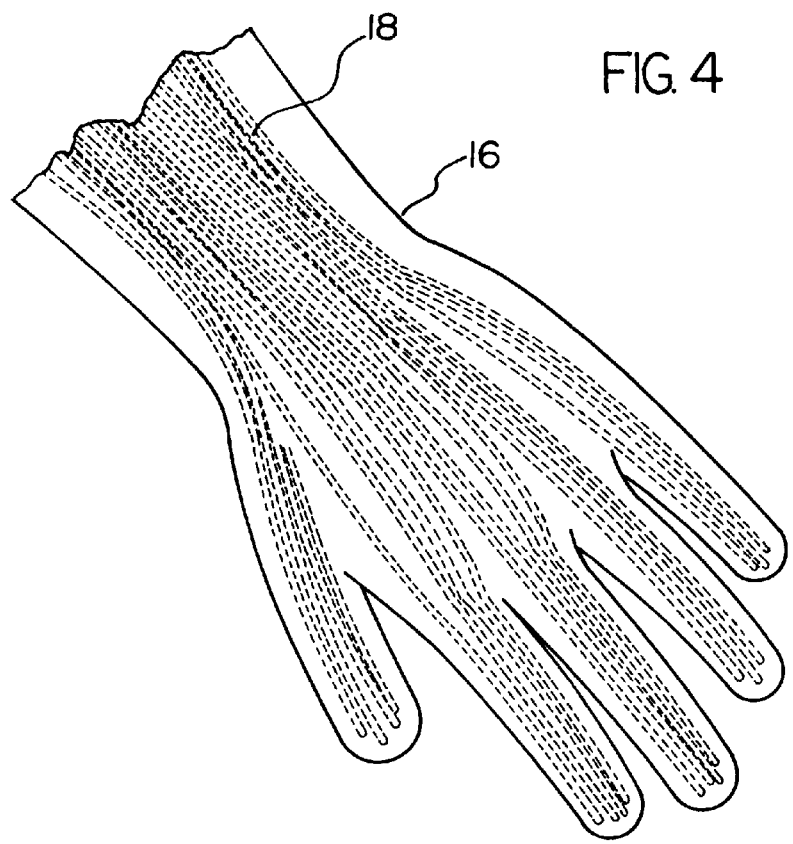
FIG. 4 is a perspective view of one of the appendages of the present invention and the fiber optic strands situated therein.

With reference now to the drawings, and in particular to FIGS. 1 through 4 thereof, a new multi-cultural doll embodying the principles and concepts of the present invention and generally designated by the reference numeral 10 will be described.

The present invention, designated as numeral 10, includes a doll 12 simulating a form of a woman and having miniature clothes 14, trinkets and accessories being situated thereon. Preferably, a plurality of unillustrated soft pads are included for being inserted in various locations beneath the clothes for simulating mature features, aging and pregnancies. The doll has a head and appendages 16 being constructed from a soft transparent material such as silicon or the like. A plurality of fiber optic strands 18 are mounted in side-by-side relationship within the transparent material.

Next provided is a color selector assembly 20 having a disk-shaped translucent color wheel 22 with a plurality pie-shaped sections each having a unique shade of color. In the preferred embodiment, the colors of the color wheel includes white, black and varying shades of brown and tan. The color wheel is coupled in concentric relationship with a post 24 which is in turn rotatably mounted within an interior of the doll. The color selector assembly further includes a frusto-conical dial 26 fixed on an end of the post and extending from a rear surface of the doll. The dial serves for manually rotating the color wheel.

The color selector assembly further includes a bulb 28 fixedly mounted within the interior space of the doll adjacent to a first side of the color wheel. Ends of each of the fiber optic strands of the doll terminate on a second side of the color wheel adjacent to the bulb. As such, a color of the doll may be changed by way of the dial. As an option, eyes of the doll may be adapted to change color by means similar to that of the appendages. It should be understood that alternate means of changing the color of the doll may be employed such as the insertion of fluids of various colors within a hollow interior of the doll.

Mounted within a rear of the doll is a tape player 30 for playing back a message associated with an ethnicity associated with the current color of the doll. Such message may include information relating to various cultures or the like. Further, the tape player may be manually operated or, in the alternative, work automatically with the manipulation of the dial of the color selector assembly. The tape player and bulb of the color selector assembly are preferably powered by a plurality of batteries situated within the doll.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A doll capable of simulating various skin colors for representing various cultures comprising, in combination:

a doll simulating a form of a woman and including miniature clothes being situated on the doll, the doll having a cavity therein, the doll having a head and appendages being constructed from a transparent material, wherein a plurality of fiber optic strands are mounted in side-by-side relationship and extending within the transparent material of the head and appendages of the doll;

a color selector assembly mounted in the cavity of the doll, the color selector assembly including a disk-shaped translucent color wheel with a plurality of pie-shaped sections each of the pie-shaped sections having a unique shade of color, the color wheel being mounted on a post, the post being rotatably mounted in the cavity of the doll, the color selector assembly further including a dial fixed on an end of the post and extending from a rear surface of the doll for permitting manual rotation of the dial, and a bulb fixedly mounted in the cavity of the doll adjacent to a first side of the color wheel, wherein ends of each of the fiber optic strands of the doll terminate on a second side of the color wheel adjacent to the bulb such that the ends of the fiber optic strands are illuminated by the bulb through the color of the pie-shaped sections so that a color of the transparent material of the head and appendages of the doll may be selectively changed by way of rotating the dial; and a tape player mounted in the doll adapted for generating a sound message associated with an ethnicity associated with the current color of the doll.

2. A doll capable of simulating various skin colors for representing various cultures comprising:

a doll simulating a form of a person, the doll having a cavity therein, the doll having a head and appendages being constructed from a transparent material, wherein a plurality of fiber optic strands are mounted in side-by-side relationship and extending within the transparent material of the head and appendages of the doll;

a color selector assembly mounted in the cavity of the doll, the color selector assembly including a selectively rotatable translucent color wheel with a plurality of pie-shaped sections, each of the pie-shaped sections having a unique shade of color, and a bulb mounted adjacent to a first side of the color wheel, wherein ends of each of the fiber optic strands of the doll terminate on a second side of the color wheel adjacent to the bulb such that the ends of the fiber optic strands are illuminated by the bulb through the color of the pie-shaped sections so that a color of the transparent material of the head and appendages of the doll may be selectively changed by way of rotating the dial; and mounted in the doll adapted for generating a sound message associated with an ethnicity associated with the current color of the doll.

3. The doll of claim 2 wherein the color wheel is mounted on a post, the post being rotatably mounted in the cavity of the doll, the color selector assembly further including a dial fixed on an end of the post and extending from a rear surface of the doll for permitting manual rotation of the dial.

4. The doll of claim 2 additionally comprising miniature clothes being situated on the doll.

* * * * *